Nov. 2, 1937. J. A. O'NEILL 2,098,158
BANK STATEMENT SHEET AND CARBON SEPARATING APPARATUS
Filed July 31, 1936 3 Sheets-Sheet 1
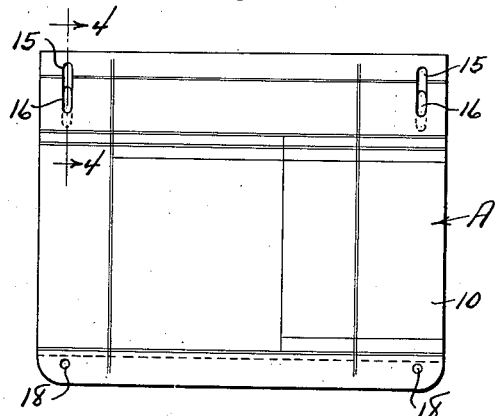
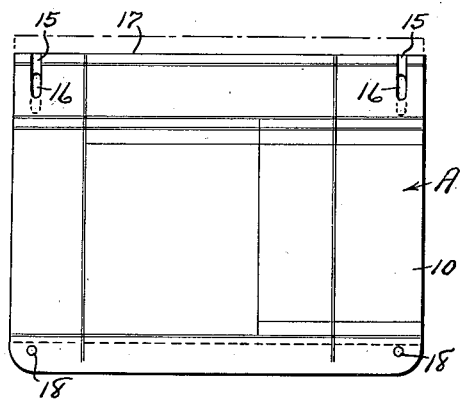
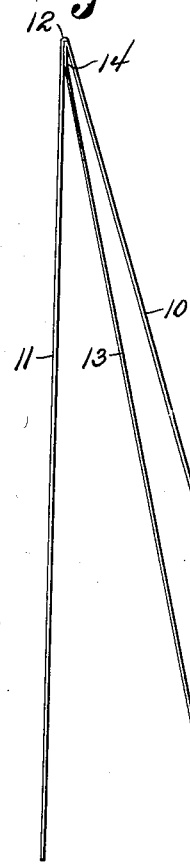
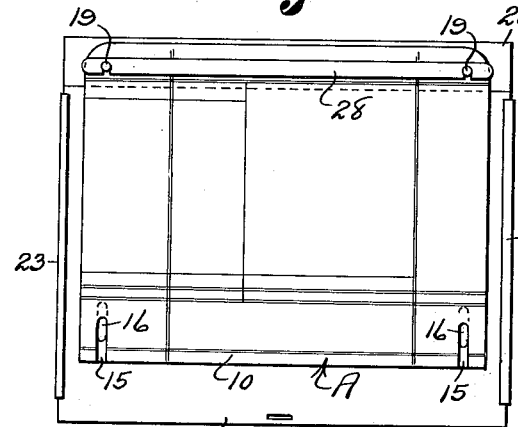
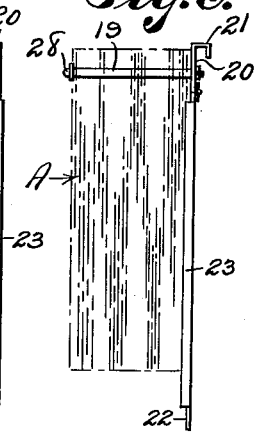
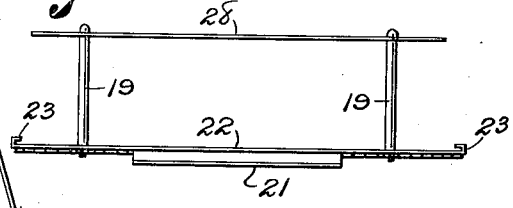
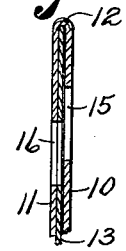
Joseph A. O'Neill
INVENTOR
BY Victor J. Evans & Co.
ATTORNEYS

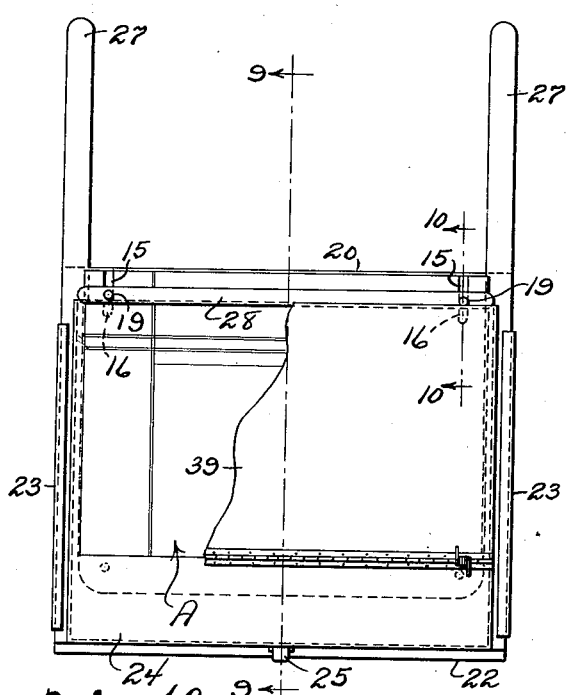
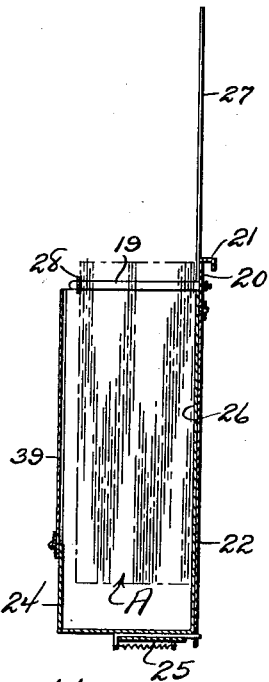
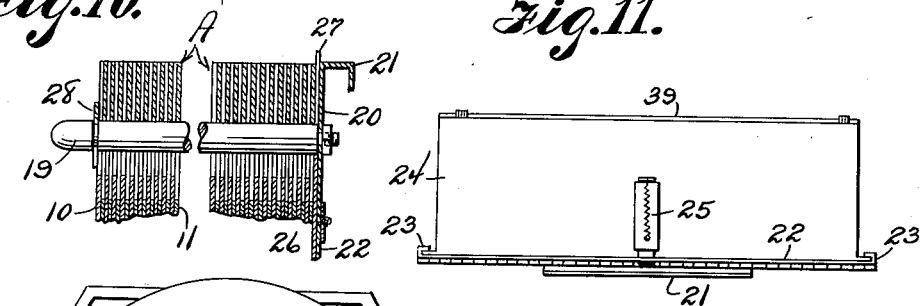
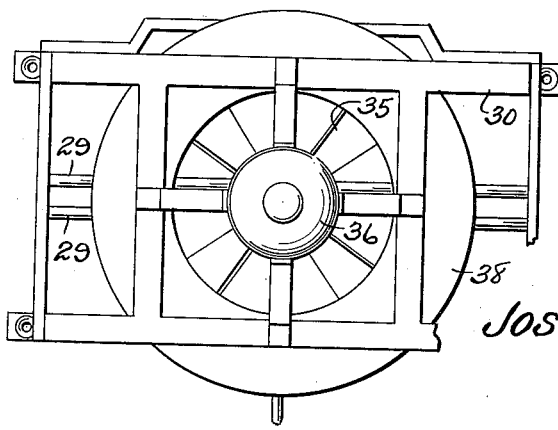

Nov. 2, 1937.   J. A. O'NEILL   2,098,158
BANK STATEMENT SHEET AND CARBON SEPARATING APPARATUS
Filed July 31, 1936    3 Sheets-Sheet 3
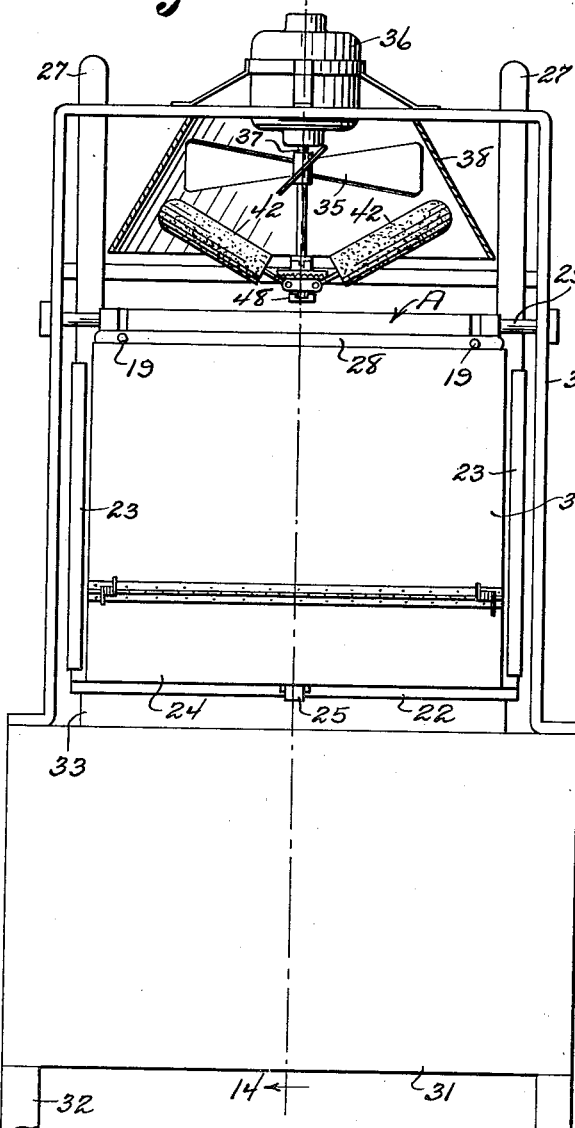
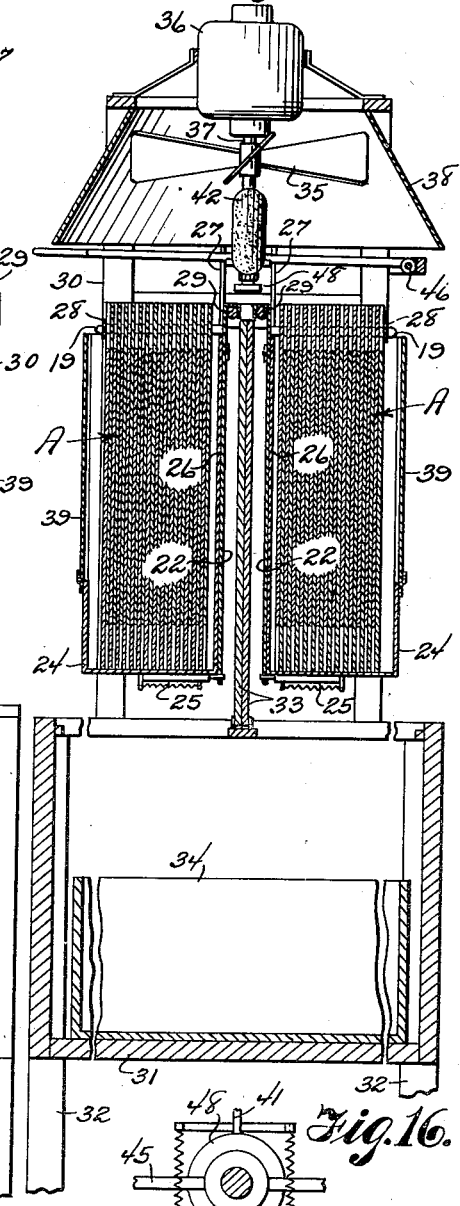
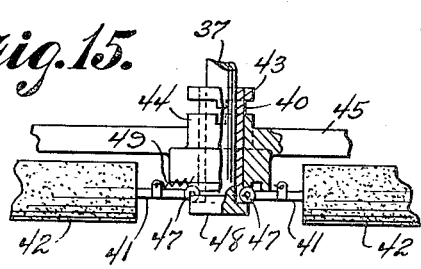
Joseph A. O'Neill
INVENTOR
BY Victor J. Evans & Co.
ATTORNEYS Patented Nov. 2, 1937

2,098,158

UNITED STATES PATENT OFFICE 2,098,158

BANK STATEMENT SHEET AND CARBON SEPARATING APPARATUS

Joseph A. O'Neill, Toledo, Ohio

Application July 31, 1936, Serial No. 93,729

10 Claims. (Cl. 282—1)

The invention relates to a sheet separating device and more especially to a bank statement sheet and carbon separating apparatus.

The primary object of the invention is the provision of an apparatus of this character, wherein multiple record sheets, as for example, bank statements to depositors each including an original record sheet, duplicate and carbon sheets interleaved therewith can be racked so that the carbon sheet and the original bank statement sheet can be conveniently and successively removed without necessitating manual handling thereof for this purpose, the sheets when in the rack will be separated for the removal of first the carbon sheet and in sequence the original sheet, the removed carbon sheets being collected in a receiver while the removed original sheets will be retained under separation in a holder thereby enabling the handling of bank statements of considerable volume with dispatch and economically.

Another object of the invention is the provision of an apparatus of this character, wherein the construction thereof is novel in its entirety and will assure the convenient and quick separation of bank statement sheets and carbon sheets without requiring manual handling for this purpose.

A further object of the invention is the provision of an apparatus of this character, wherein the original and duplicate of a bank statement for a depositor will be in the nature of a folder and has interleaved therewith a carbon sheet which is hinged next to the fold of the said folder to maintain the same properly interleaved with the folder and to enable the easy and quick separation of the said sheets from each other. The folder is initially cut along the fold so that by hanging the folder in an inverted position in a rack the carbon sheet can be separated and removed from between the original and duplicate statement sheets whereupon these latter sheets on reracking or rehanging thereof can be easily and quickly separated whereby the original will be displaced from the duplicate sheet which will be retained racked and the freed original sheet can be mailed or delivered to a depositor and thus the manual handling for separating purposes of said sheets is entirely eliminated.

A further object of the invention is the provision of an apparatus of this character, which is simple in its construction, thoroughly reliable and effective in its operation, readily and easily handled, requiring but two attendants for bulk handling of bank statement sheets, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a plan view of a twin sheet bank statement constructed in accordance with the invention for use in the apparatus.

Figure 2 is a view similar to Figure 1 showing the folder cut for application in the apparatus to permit separation of the sheets of said folder and the carbon sheet.

Figure 3 is an end edge elevation of the folder with the carbon sheet therein and the sheets of said folder and carbon sheet being slightly open for illustrating the hinging of the carbon sheet interleaved in the folder.

Figure 4 is an enlarged fragmentary sectional view on the line 4—4 of Figure 1.

Figure 5 is a plan view showing the statement sheets racked in a holder of the apparatus for the convenient separation of the carbons from interleaved with said folders.

Figure 6 is an end elevation thereof.

Figure 7 is a bottom plan view with the sheets of the folders and carbon sheets removed.

Figure 8 is a plan view showing the bank statement sheets reversed, racked and held for the separation of the original sheets from the duplicate sheets.

Figure 9 is a sectional view on the line 9—9 of Figure 8.

Figure 10 is a fragmentary enlarged sectional view on the line 10—10 of Figure 8.

Figure 11 is a bottom plan view of those parts assembled as shown in Figures 8 and 9.

Figure 12 is a top plan view of the apparatus.

Figure 13 is a front elevation thereof.

Figure 14 is a sectional view on the line 14—14 of Figure 13 looking in the direction of the arrows.

Figure 15 is a fragmentary elevation partly in section of the separating brushes of the apparatus and adjuncts.

Figure 16 is a detailed fragmentary plan view partly in section of Figure 15.

Similar reference characters indicate corresponding parts throughout the several views in the drawings.

Referring to the drawings in detail, A designates generally a bank statement multi-sheet folder including an original statement sheet 10 and a duplicate statement sheet 11, respectively, these in the folder are united or joined at the fold 12 and interleaved with the latter is a carbon sheet 13 which in this instance is hinged along one longer edge at 14 to the front face of the duplicate sheet 11 next to the fold 12 so that when making up a bank statement on the original statement sheet 10 the record thereon will be transferred to the duplicate sheet 11 in the use of the carbon sheet 13. Formed in transversely opposite corners of the sheets 10 and 11 are elongated overlapping longitudinally aligned slots 15 and 16, respectively, the latter slots being disposed close to the fold 12 while the slots 16 are considerably removed therefrom and this arrangement is to have the said slots 15 lie across a line of cut through the sheets 10 and 11 as at 17 and by such cutting of these sheets at this line 17 the fold 12 will be cut away disconnecting the sheets of the folder and also freeing the carbon sheet 13 at the hinge 14 from the duplicate sheet 11 and also resulting in opening the slots 15 only through the severed edge of the original sheet 10. The remaining corners of the sheets 10 and 11 are punched to provide aligned holes 18 so that the sheets 10 and 11 with the carbon sheet 13 interleaved therewith can be reversed and racked by the hanging of the said sheets 10 and 11 upon pins 19 made fast to and projecting forwardly from a racking plate 20 having at its upper edge a rearwardly and downwardly bent flange constituting a hanger hook or suspension ledge 21 for a purpose presently described.

The plate 20 includes a hinged section 22 which at opposite ends is formed with cleat flanges 23 for the slidable interfitting with this section 22 of a frontal housing 24 which is releasably held on the said section 22 by a spring latch 25. The housing at its rear wall 26 is formed with piloting extensions or fingers 27 for the convenient initial guiding of the housing 24 onto the section 22 into position for incasing the said rack.

The sheets 10 and 11 with the carbon sheets 13 interleaved therewith on racking thereof by the holes 18 accommodating the pins 19 and held by a slip latched clamping bar 28 engaged on the pins 19 prior to the application of the housing 24, the carbon sheets 13 are readily freed from between the sheets 10 and 11 and this is brought about in a manner hereinafter described.

The racking plates 20, there preferably being two of these, are suspended perpendicularly opposite to each other by the hanging thereof on cross bars 29 built within an upstanding open frame 30 rising from a box-like receiver 31 having the legs 32. This receiver 31 has supported centrally of the open top thereof vertically swinging hinged table leaves 33 which are adapted to be swung to perpendicular position so that carbon sheets 13 between the racked sheets 10 and 11 will fall within said receiver 31 through the top when open and into a till or tray 34 it being understood, of course, that the housings 24 are detached when these carbon sheets 13 are being deposited in the receiver 31. When the housings 24 are detached, these table leaves can be lowered to a horizontal position and thus function as a table top to the receiver 31. Within the frame 30 above the bars 29 is a bladed fan wheel 35 of the electric motor type, the motor being indicated at 36 and its power shaft 37 carries the said wheel 35. The fan wheel when active forces the air currents downwardly in the direction of the racked sheets 10 and 11 driving the carbon sheets 13 from being interleaved therewith.

When this action takes place the table leaves 33 are in perpendicular position. The wheel 35 is within a truncated conical shaped hood 38 built within the frame 30 for directing down flow of air currents when the wheel 35 is operated.

When the carbon sheets 13 are separated from interleaved relation with the sheets 10 and 11, these are reversed by the racking thereof on the pins 19 which engage in the slots 15 and 16. At this time the housings 24 are placed with the sections 22 of the rack 20 as is clearly shown in Figures 13 and 14 of the drawings so that by the fan 35 operating the sheets 10 and 11 due to air currents they will be spread from each other and the original sheets 10 by the presence of the open slots 15 therein will be caused to drop from the rack and come to rest in the housings 24 as shown in Figure 14 of the drawings whence they can be readily removed for the separation thereof from the sheets 11 which remain racked on the pins 19 when the said housings 24 are separated from the racks 20. These housings 24 each has a hinged front door section 39 permitting convenient access to the sheets 10 and 11 when racked and the housings 24 are fastened upon the racks 20 as shown in Figure 14 of the drawings.

Loosely fitted on the lower end of the shaft 37 of the motor 36 is a clutch sleeve 40 to the lower end of which at a diametrically opposite point are hinged the raising and lowering arms 41 of brushes 42, the upper end of the sleeve 40 being formed with a clutch head 43 for coaction with a clutch collar 44 loosely encircling the sleeve 40 and formed with a lever 45 hinged at 46 to the frame 30. The collar 44 acts as a runner on the sleeve 40 so that when the lever 45 is lowered this collar 44 moves the said sleeve 40 in a direction to have the hinges 47 for the arms 41 clutch with a clutch head 48 on the end of the shaft 37 and also moving the arms 41 of the brushes 42 into a horizontal position so that they will sweep across the top edges of the sheets 10 and 11 and be positively driven by the shaft 37 for the spreading of the said sheets from each other with the result that the original sheets 10 will become unracked or dropped in the housings 24 for the separation thereof from the sheets 11 which remain racked on the pins 19 of the racks 20. The arms 41 have connected therewith coiled retractile springs 49 which cause a lifting of the brushes 42 away from the edges of the sheets racked when the collar 44 is shifted upwardly on the sleeve 40 and in this upward movement of the collar it becomes clutched with the head 43 so that the brushes 42 become passive or stop in that the sleeve 40 will become unclutched from the head 48 of the shaft 37 to be freed of driving action therefrom.

It is the idea of the user of the apparatus to have the brushes 42 active when separating the carbon sheets from interleaved relation with the sheets 10 and 11 which is the first step of separation and also when separating the original sheets 10 from the duplicate sheets 11 of the bank statements.

It is to be understood, of course, that when it is desired to separate the carbon sheets interleaved with the sheets 10 and 11 that these said sheets be regulated by engaging the pins 19 in the holes 18 and in this instance such statement sheets are upside down and have been converted from folders by the cutting thereof to independent sheets. Then when the carbon sheets have been removed these sheets 10 and 11 are racked by the pins 19 engaged in the slots 15 and 16 in said sheets. Due to the open ended slots 15 in the sheets 10 these will drop from the rack into the housings 24 while the duplicate sheets with the closed slots 16 will remain hung or suspended on the pins 19 of the racks 20. In this manner the carbon sheets 13 are readily separated from the original and duplicate sheets of the bank statements and also the original separated from the duplicate sheets whence the original sheets can be mailed to the depositors of a banking institution. These bank statements are of the conventional type now employed in rendering monthly statements to the depositors of a bank.

What is claimed is:

1. A device of the character described comprising an upstanding open frame having a box-like receiver, cross bars built within said frame above the receiver and accessible from opposite sides of said frame, racking plates removably suspended from said bars and having cleat flanges at opposite sides thereof, frontal housings slidably interfitted with said plates at the cleat flanges thereof, racking pins on said plates and having slip latched clamping bars, an electric motor type fan above the housings, a hood about the fan for directing draft therefrom downwardly in the direction of the housings, and rotatable brushes movable into engagement with work when upon the pins and rotated by the fan.

2. A device of the character described comprising an upstanding open frame having a box-like receiver, cross bars built within said frame above the receiver and accessible from opposite sides of said frame, racking plates removably suspended from said bars and having cleat flanges at opposite sides thereof, frontal housings slidably interfitted with said plates at the cleat flanges thereof, racking pins on said plates and having slip latched clamping bars, an electric motor type fan above the housings, a hood about the fan for directing draft therefrom downwardly in the direction of the housings, rotatable brushes movable into engagement with work when upon the pins and rotated by the fan, and means coacting with the brushes and fan for releasing driving action of the brushes by said fan.

3. A device of the character described comprising an upstanding open fame having a box-like receiver, cross bars built within said frame above the receiver and accessible from opposite sides of said frame, racking plates removably suspended from said bars and having cleat flanges at opposite sides thereof, frontal housings slidably interfitted with said plates at the cleat flanges thereof, racking pins on said plates and having slip latched clamping bars, an electric motor type fan above the housings, a hood about the fan for directing draft therefrom downwardly in the direction of the housings, rotatable brushes movable into engagement with work when upon the pins and rotated by the fan, means coacting with the brushes and fan for releasing driving action of the brushes by said fan, and means for raising the brushes when affected by the last-named means for releasing the driving connection of said brushes with the fan.

4. A device of the character described comprising an upstanding open frame having a box-like receiver, cross bars built within said frame above the receiver and accessible from opposite sides of said frame, racking plates removably suspended from said bars and having cleat flanges at opposite sides thereof, frontal housings slidably interfitted with said plates at the cleat flanges thereof, racking pins on said plates and having slip latched clamping bars, an electric motor type fan above the housings, a hood about the fan for directing draft therefrom downwardly in the direction of the housings, rotatable brushes movable into engagement with work when upon the pins and rotated by the fan, means coacting with the brushes and fan for releasing driving action of the brushes by said fan, means for raising the brushes when affected by the last-named means for releasing the driving connection of said brushes with the fan, and means for releasably latching the housings with the plates.

5. A device of the character described comprising an upstanding open frame having a box-like receiver, cross bars built within said frame above the receiver and accessible from opposite sides of said frame, racking plates removably suspended from said bars and having cleat flanges at opposite sides thereof, frontal housings slidably interfitted with said plates at the cleat flanges thereof, racking pins on said plates and having slip latched clamping bars, an electric motor type fan above the housings, a hood about the fan for directing draft therefrom downwardly in the direction of the housings, rotatable brushes movable into engagement with work when upon the pins and rotated by the fan, means coacting with the brushes and fan for releasing driving action of the brushes by said fan, means for raising the brushes when affected by the last-named means for releasing the driving connection of said brushes with the fan, means for releasably latching the housings with the plates, and means manually operated for moving the brushes into engagement with the work.

6. A device of the character described comprising an upstanding open frame having a box-like receiver, cross bars built within said frame above the receiver and accessible from opposite sides of said frame, racking plates removably suspended from said bars and having cleat flanges at opposite sides thereof, frontal housings slidably interfitted with said plates at the cleat flanges thereof, racking pins on said plates and having slip latched clamping bars, an electric motor type fan above the housings, a hood about the fan for directing draft therefrom downwardly in the direction of the housings, rotatable brushes movable into engagement with work when upon the pins and rotated by the fan, means coacting with the brushes and fan for releasing driving action of the brushes by said fan, means for raising the brushes when affected by the last-named means for releasing the driving connection of said brushes with the fan, means for releasably latching the housings with the plates, means manually operated for moving the brushes into engagement with the work, and hinged sections included with the plates and said housings.

7. A device of the character described comprising an upstanding open frame having a box-like receiver, cross bars built within said frame above the receiver and accessible from opposite sides of said frame, racking plates removably suspended from said bars and having cleat flanges at opposite sides thereof, frontal housings slidably interfitted with said plates at the cleat flanges thereof, racking pins on said plates and having slip latched clamping bars, an electric motor type fan above the housings, a hood about the fan for directing draft therefrom downwardly in the direction of the housings, rotatable brushes movable into engagement with work when upon the pins and rotated by the fan, means coacting with the brushes and fan for releasing driving action of the brushes by said fan, means for raising the brushes when affected by the last-named means for releasing the driving connection of said brushes with the fan, means for releasably latching the housings with the plates, means manually operated for moving the brushes into engagement with the work, hinged sections included with the plates and said housings, and means on the housings for initially guiding the same into interfitting relation with the cleat flanges on said plates.

8. A device of the character described comprising an upstanding open frame having a box-like receiver, cross bars built within said frame above the receiver and accessible from opposite sides of said frame, racking plates removably suspended from said bars and having cleat flanges at opposite sides thereof, frontal housings slidably interfitted with said plates at the cleat flanges thereof, racking pins on said plates and having slip latched clamping bars, an electric motor type fan above the housings, a hood about the fan for directing draft therefrom downwardly in the direction of the housings, rotatable brushes movable into engagement with work when upon the pins and rotated by the fan, and carbon sheet interleaved duplex bank statement folders mountable upon said racking pins for action thereon by said fan and brushes for the separation in sequence of the interleaved carbon sheets for deposit within the receiver and the duplicate statement sheets from one another.

9. A device of the character described comprising an upstanding open frame having a box-like receiver, cross bars built within said frame above the receiver and accessible from opposite sides of said frame, racking plates removably suspended from said bars and having cleat flanges at opposite sides thereof, frontal housings slidably interfitted with said plates at the cleat flanges thereof, racking pins on said plates and having slip latched clamping bars, an electric motor type fan above the housings, a hood about the fan for directing draft therefrom downwardly in the direction of the housings, rotatable brushes movable into engagement with work when upon the pins and rotated by the fan, means coacting with the brushes and fan for releasing driving action of the brushes by said fan, means for raising the brushes when affected by the last-named means for releasing the driving connection of said brushes with the fan, means for releasably latching the housings with the plates, means manually operated for moving the brushes into engagement with the work, hinged sections included with the plates and said housings, means on the housings for initially guiding the same into interfitting relation with the cleat flanges on said plates, and carbon sheet interleaved duplex bank statement folders mountable upon said racking pins for action thereof by said fan and brushes for the separation in sequence of the interleaved carbon sheets for deposit within the receiver and the duplicate statement sheets from one another.

10. A device of the character described comprising an upstanding open frame having a box-like receiver, cross bars built within said frame above the receiver and accessible from opposite sides of said frame, racking plates removably suspended from said bars and having cleat flanges at opposite sides thereof, frontal housings slidably interfitted with said plates at the cleat flanges thereof, racking pins on said plates and having slip latched clamping bars, an electric motor type fan above the housings, a hood about the fan for directing draft therefrom downwardly in the direction of the housings, rotatable brushes movable into engagement with work when upon the pins and rotated by the fan, means coacting with the brushes and fan for releasing driving action of the brushes by said fan, means for raising the brushes when affected by the last-named means for releasing the driving connection of said brushes with the fan, means for releasably latching the housings with the plates, means manually operated for moving the brushes into engagement with the work, hinged sections included with the plates and said housings, means on the housings for initially guiding the same into interfitting relation with the cleat flanges on said plates, and carbon sheet interleaved duplex bank statement folders mountable upon said racking pins for action thereof by said fan and brushes for the separation in sequence of the interleaved carbon sheets for deposit within the receiver and the duplicate statement sheets from one another, the housings being separated from the plates when dislodging the carbon sheets and attached to the said plates for the catching of the separated bank statement sheets.

JOSEPH A. O'NEILL.